United States Patent
Nakahara (10) Patent No.: US 9,869,923 B2
(45) Date of Patent: Jan. 16, 2018

(54) LENS APPARATUS AND IMAGE PICKUP APPARATUS INCLUDING THE SAME

(71) Applicant: CANON KABUSHIKI KAISHA, Tokyo (JP)

(72) Inventor: Makoto Nakahara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/392,148

(22) Filed: Dec. 28, 2016

(65) Prior Publication Data
US 2017/0205684 A1 Jul. 20, 2017

(30) Foreign Application Priority Data

Jan. 18, 2016 (JP) .................................. 2016-007071

(51) Int. Cl.
| | |
|---|---|
| G03B 15/03 | (2006.01) |
| G03B 15/06 | (2006.01) |
| G02B 6/10 | (2006.01) |
| G02B 7/105 | (2006.01) |
| G02B 13/24 | (2006.01) |
| F21V 8/00 | (2006.01) |
| G03B 17/12 | (2006.01) |

(52) U.S. Cl.
CPC ........... *G03B 15/06* (2013.01); *G02B 6/0051* (2013.01); *G02B 6/0068* (2013.01); *G02B 7/105* (2013.01); *G02B 13/24* (2013.01); *G03B 15/03* (2013.01); *G03B 17/12* (2013.01); *G03B 2215/0539* (2013.01)

(58) Field of Classification Search
None
See application file for complete search history.

(56) References Cited

U.S. PATENT DOCUMENTS

| | | | | |
|---|---|---|---|---|
| 2,682,603 A | * | 6/1954 | Dine | G03B 15/05 362/16 |
| 3,474,242 A | * | 10/1969 | Forrant | G03B 15/03 362/17 |
| 8,515,274 B2 | | 8/2013 | Daijo | |

(Continued)

FOREIGN PATENT DOCUMENTS

| | | |
|---|---|---|
| JP | 2006337422 A | 12/2006 |
| JP | 2011247978 A | 12/2011 |

*Primary Examiner* — W B Perkey
(74) *Attorney, Agent, or Firm* — Rossi, Kimms & McDowell LLP (57) ABSTRACT

A lens apparatus includes an image pickup optical system; a holding frame to hold the image pickup optical system; and an illumination device that is mounted on outer peripheral portion of an object side of holding frame, and is configured to radiate light, in which the illumination device includes: a light guide member that has a circular optical path in which light is subjected to internal reflection to propagate, and a light emitting surface for emitting light to object side; and a light source that is arranged such that a normal direction of a light emitting surface of the light source faces a tangential direction of a circle of light guide member, and is configured to emit light entering the light guide member. The arrangements and shapes of holding frame, light guide member, and lens closest to object side of image pickup optical system are each appropriately set.

9 Claims, 4 Drawing Sheets

(56) References Cited

U.S. PATENT DOCUMENTS

2006/0093344 A1* 5/2006 Neel .................. G03B 15/05
                                                    396/176
2017/0131620 A1* 5/2017 Nakahara ............. G02B 6/0051
2017/0205684 A1* 7/2017 Nakahara ............... G03B 15/06

* cited by examiner

LENS APPARATUS AND IMAGE PICKUP APPARATUS INCLUDING THE SAME

BACKGROUND OF THE INVENTION

Field of the Invention

The present invention relates to a lens apparatus suitable for a video camera, an electronic still camera, a TV camera, or the like that has a function of close-up shooting, and to an image pickup apparatus including the lens apparatus.

Description of the Related Art

Macro lenses have been known as image pickup optical systems that are used mainly for close-up shooting. In general, in close-up shooting, a distance from an object to an image pickup optical system is short, and hence the image pickup optical system or a photographer casts its shadow over the object in some cases. Thus, illumination is often needed in close-up shooting. Hitherto, xenon flash tubes have been used as light sources for image pickup. However, light from a xenon flash tube is instant pulsed light, and hence there is a problem in that an illuminated object image cannot be visually checked through a finder or the like.

As a measure for the problem, in recent years, light emitting diodes having a wide wavelength band in a visible region have been put into practical use. In each of Japanese Patent Application Laid-Open No. 2006-337422 and Japanese Patent Application Laid-Open No. 2011-247978, there is disclosed an illumination device configured to illuminate an object side with a light emitting diode that is arranged on a holding frame configured to hold a lens closest to an object side of an image pickup optical system.

In the illumination device disclosed in Japanese Patent Application Laid-Open No. 2006-337422, a plurality of white light emitting diodes are arranged in a circular manner on the outer peripheral portion of the holding frame, which is configured to hold the lens closest to the object side. The illumination device disclosed in Japanese Patent Application Laid-Open No. 2011-247978 uses a light guide portion having a circular optical path in which light propagates. It is also disclosed that an amount of light radiated from the illumination device is changed by changing a position of a light source in an optical axis direction.

In the illumination device disclosed in Japanese Patent Application Laid-Open No. 2006-337422, each light source is arranged such that a light emitting surface of the light source faces an optical axis direction of the image pickup apparatus. Thus, a large number of light sources are needed in order to uniformly illuminate an object.

In the illumination device disclosed in Japanese Patent Application Laid-Open No. 2011-247978, an interval between two light sources is short, and hence it is difficult to uniformly illuminate an object.

SUMMARY OF THE INVENTION

It is an object of the present invention to provide a small lens apparatus capable of achieving uniform illumination without increasing the number of light sources, and an image pickup apparatus including the lens apparatus.

According to one embodiment of the present invention, there is provided a lens apparatus, including:

an image pickup optical system;

a holding frame configured to hold the image pickup optical system; and an illumination device that is mounted on an object side of the holding frame, and is configured to radiate light, in which the illumination device includes:

a light guide member that has a circular optical path in which light is subjected to internal reflection to propagate, and a light emitting surface for emitting the light to the object side; and a light source that is arranged such that a normal direction of a light emitting surface of the light source faces a tangential direction of a circle of the light guide member, and is configured to emit light entering the light guide member, and in which the following conditional expressions are satisfied:

$$0.2 < OD/DB < 1.0;\ \text{and}$$

$$0.2 < DL/ID < 1.0,$$

where DB represents an outer diameter of the holding frame, OD represents an outer diameter of the light guide member, ID represents an inner diameter of the light guide member, and DL represents an outer diameter of a lens closest to the object side of the image pickup optical system.

Further features of the present invention will become apparent from the following description of exemplary embodiments with reference to the attached drawings.

DESCRIPTION OF THE EMBODIMENTS

Figure 1:
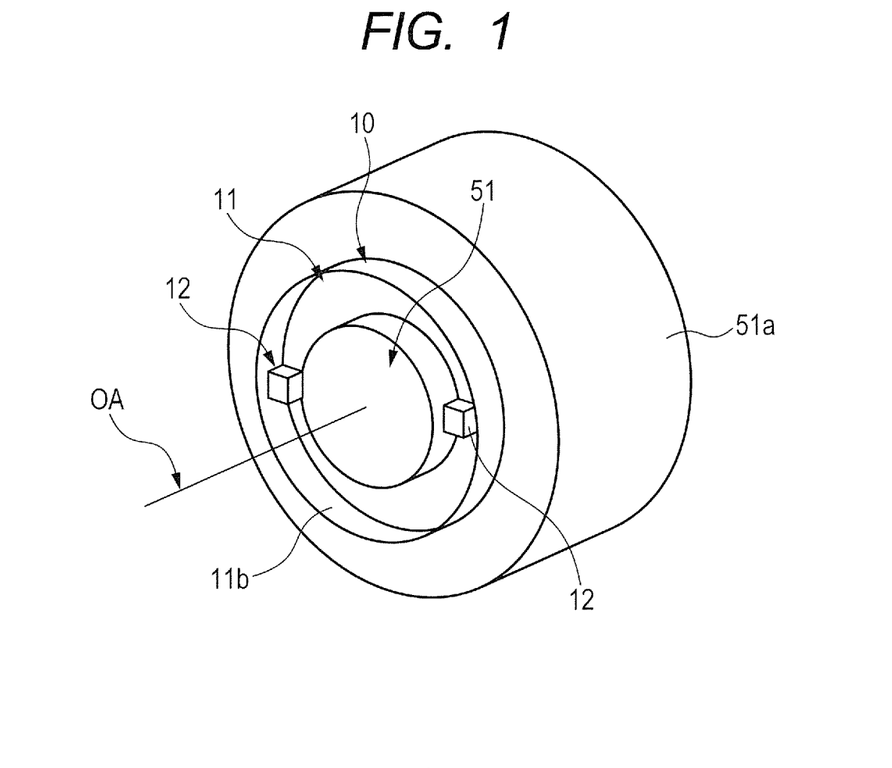
FIG. 1 is a main-part perspective view for illustrating the outer appearance of a lens apparatus of the present invention when an illumination device is mounted on a holding frame configured to hold an image pickup optical system.

In the following, exemplary embodiments of the present invention are described with reference to the attached drawings. A lens apparatus of the present invention includes an image pickup optical system, a holding frame configured to hold the image pickup optical system, and an illumination device that is mounted on an object side of the holding frame, and is configured to radiate light. FIG. 1 is a main-part perspective view for illustrating the outer appearance of the lens apparatus when an illumination device 10 is mounted on the object side (light entrance side) of the outer peripheral portion of a holding frame 51a configured to hold an image pickup optical system 51.

The illumination device 10 includes a plurality of light sources 12 and a light guide member 11 configured to propagate light from the light sources 12 through internal reflection. The light guide member 11 has a circular optical path and a light emitting surface 11b for emitting light to the object side. The plurality of light sources 12 are arranged on a part of the circle of the light guide member 11 such that the normal lines of the light emitting surfaces of the light sources face the tangential direction of the circle. The light sources 12 include white light emitting diodes, for example. The illumination device 10 is removably mounted on the holding frame 51a configured to hold the image pickup optical system 51. The image pickup optical system has an optical axis OA.

Figure 2:
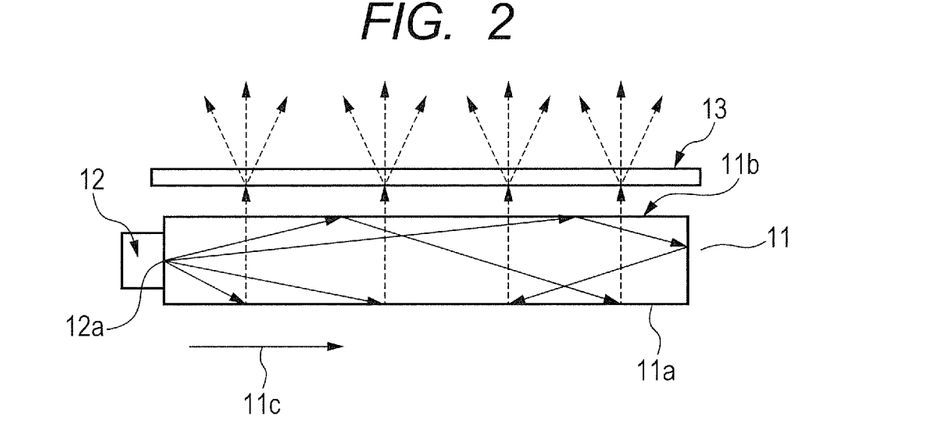
FIG. 2 is a front view for schematically illustrating an optical path inside a light guide member according to the present invention.

FIG. 2 is a sectional view of the light guide member 11 of FIG. 1 in which a part of the circular portion of the light guide member 11 is lineally developed. FIG. 2 is a view for schematically illustrating an optical path of light that propagates inside the light guide member 11. The light guide member 11 illustrated in FIG. 2 is made of a transparent resin and has a circular shape. The rear surface (one side surface opposite to the object side) (lower surface in the front view) of the light guide member 11 is made up of a reflecting portion 11a being a white paint or a mirror sheet. Light from the light sources 12 is totally reflected on the inner surface of the light guide member 11, and is reflected by the reflecting portion 11a. Then, the light is emitted to the object side from the front surface (upper surface in the front view) (light emitting surface) 11b.

The reflecting portion 11a is formed on the one side surface of the circle of the light guide member 11, which is opposite to the object side. The light sources 12 are each arranged such that the normal direction of a light emitting surface 12a thereof faces a tangential direction 11c of the circle of the light guide member 11. A light flux emitted from the light source 12 enters the light guide member 11 from a light entrance surface thereof, is totally reflected inside the circle of the light guide member 11, and is reflected by the reflecting portion 11a in a diffuse manner. Then, the light is emitted from the circular light emitting surface 11b. A diffuser plate 13 configured to diffuse a light flux from the light emitting surface 11b and emit the diffused light flux is provided. The diffuser plate 13 is provided as needed and may be omitted.

When the normal direction of the light emitting surface 12a of the light source 12 does not face the tangential direction 11c of the circle of the light guide member 11, light emitted from the light source 12 is directly radiated on the object surface side. Thus, a large number of light sources are needed in order to obtain illumination having a uniform and constant angular distribution on the object side.

In the present invention, the plurality of light sources 12 are arranged such that the normal directions of the light emitting surfaces face the tangential direction of the light guide member 11. As a result, with a small number of light sources, a light flux having a uniform and constant angular distribution may be radiated on the object side as illumination light in close-up shooting. Illumination having a uniform light distribution is thus obtained. Further, the diffuser plate 13 configured to diffuse light is provided on the object side of the light guide member 11. With this configuration, illumination having a uniform light distribution is obtained.

Figure 3A:
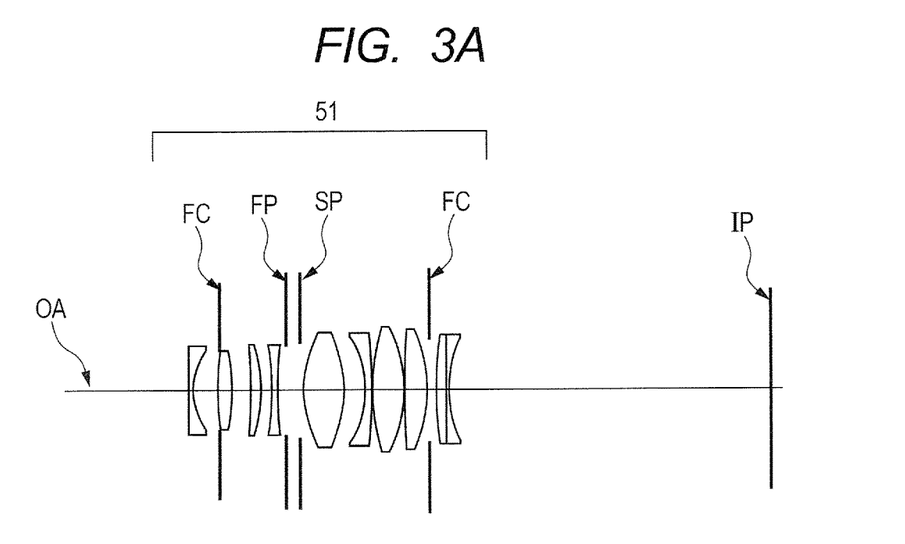
FIG. 3A is a lens sectional view of an image pickup optical system supporting close-up shooting according to the present invention.
Figure 3B:
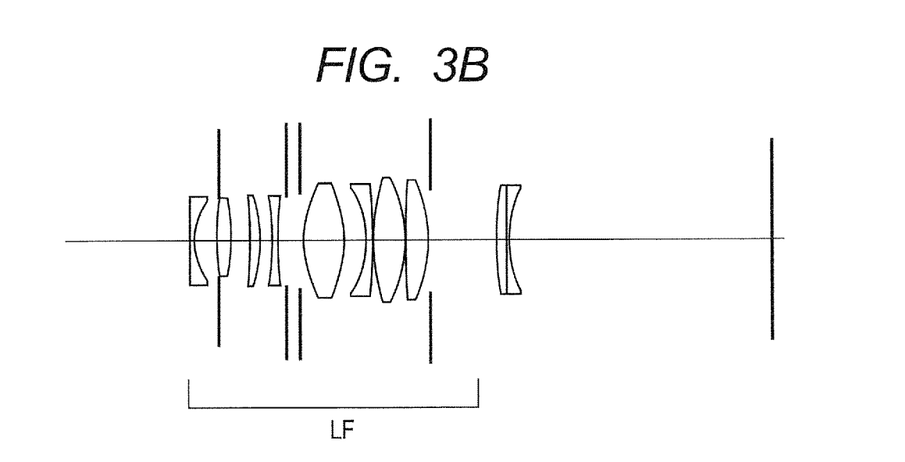
FIG. 3B is a lens sectional view of the image pickup optical system supporting close-up shooting according to the present invention.

FIG. 3A and FIG. 3B are each a lens sectional view of the image pickup optical system 51 having a macro photographing function, on which the lens apparatus of the present invention can be mounted. The lens sectional view of FIG. 3A is a state focusing on an object at infinity, and the lens sectional view of FIG. 3B is a state focusing on a closest distance object. In the lens sectional views, the left side corresponds to the object side (front side), and the right side corresponds to an image side (rear side).

An aperture stop SP, an auxiliary stop FP, flare cutters FC, the optical axis OA, and an image plane IP are also illustrated in FIG. 3A and FIG. 3B. The image plane IP corresponds to an image pickup plane of an image pickup element (photo-electric conversion element), e.g., a CCD sensor or a CMOS sensor when the lens apparatus is used as a photographing optical system of a digital camera, a video camera, or a monitoring camera. Further, the image plane IP corresponds to a film plane when the lens apparatus is used as a photographing optical system of a silver-halide film camera.

Next, features of the lens apparatus of the present invention are described. The illumination device 10 according to the present invention includes the guide member 11 that is made of a transparent resin and has the circular optical path in which light is repeatedly subjected to internal reflection to propagate. The illumination device 10 also includes the plurality of light sources 12 that are arranged such that the normal directions of the light emitting surfaces face the tangential direction of the circle of the light guide member 11, and are configured to emit light entering the light guide member 11 from one end of the light guide member 11.

In a lens apparatus of each Example of the present invention, the light guide member 11 has the light emitting surface 11b for subjecting light from the light sources 12 to internal reflection, and emitting light from a part of the circle of the light guide member 11 to the object side. The outer diameter of the holding frame 51a is represented by DB, the outer diameter of the light guide member 11 is represented by OD, the inner diameter of the light guide member 11 is represented by ID, and the outer diameter of a front lens of the image pickup optical system is represented by DL. In this case, the following expressions are satisfied:

$$0.2<OD/DB<1.0 \quad (1); \text{ and}$$

$$0.2<DL/ID<1.0 \quad (2).$$

Next, the technical meanings of the conditional expression (1) and the conditional expression (2) are described. The conditional expression (1) defines a ratio of the outer diameter of the holding frame 51a and the outer diameter of the light guide member 11. Here, the light guide member 11 may have any shape as long as the shape is a circular shape. For example, the light guide member 11 may have an annular shape or an elliptical shape, or a part thereof. Here, when the light guide member 11 has an annular shape, the inner diameter of the light guide member 11 is set to the diameter of the inner circle thereof, and the outer diameter of the light guide member 11 is set to the diameter of the outer circle thereof. Further, when the light guide member 11 has an elliptical shape or a part thereof, the inner diameter of the light guide member 11 is set to an average of the diameter of the inscribed circle and the diameter of the circumscribed circle of the inner circumference of the light guide member 11. The outer diameter of the light guide member 11 is set to an average of the diameter of the inscribed circle and the diameter of the circumscribed circle of the outer circumference of the light guide member 11.

When the value exceeds the upper limit of the conditional expression (1), the outer diameter of the light guide member 11 is excessively increased, and it is difficult to reduce the illumination device in size. In contrast, when the value falls below the lower limit of the conditional expression (1), the outer diameter of the holding frame 51a is increased, and it is difficult to reduce the entire image pickup apparatus including the image pickup optical system 51 in size.

The conditional expression (2) defines a ratio of the outer diameter of the front lens of the image pickup optical system 51 and the inner diameter of the light guide member 11. When the value exceeds the upper limit of the conditional expression (2), the illumination device enters the angle of view of the image pickup optical system 51, which is not preferred. In contrast, when the value falls below the lower limit of the conditional expression (2), the inner diameter of the light guide member 11 is increased, and it is difficult to reduce the illumination device in size.

In each Example, as described above, the conditional expression (1) and the conditional expression (2) are satisfied so that uniform illumination can be achieved with a small number of light sources, and a lens apparatus including a small illumination device can thus be obtained.

In Examples, it is preferred that the numerical value ranges of the conditional expression (1) and the conditional expression (2) be set to the following ranges.

$$0.3 < OD/DB < 0.9 \quad (1a)$$

$$0.3 < DL/ID < 0.9 \quad (2a)$$

It is more preferred that the numerical value ranges of the conditional expression (1a) and the conditional expression (2a) be set to the following ranges.

$$0.4 < OD/DB < 0.8 \quad (1b)$$

$$0.4 < DL/ID < 0.8 \quad (2b)$$

The image pickup apparatus of the present invention includes the lens apparatus including the illumination device 10 provided on the outer peripheral portion on the light entrance side of the holding frame 51a configured to hold the image pickup optical system 51, and a camera body including the image pickup element configured to receive light of an image formed by the lens apparatus. In the lens apparatus of the present invention, it is preferred to satisfy one or more conditional expressions provided below.

A back focus of the image pickup optical system 51 when focusing on the object at infinity is represented by BF, and the focal length of the image pickup optical system 51 is represented by f. The image pickup optical system 51 includes the aperture stop SP. The lens total length of the image pickup optical system 51 is represented by TD, and a distance from the aperture stop SP to the image plane is represented by DSP. A distance from the light guide member 11 to the closest distance object when the image pickup optical system 51 focuses on the closest distance object is represented by WD. An imaging magnification of the image pickup optical system 51 when focusing on the closest distance object is represented by β. In this case, it is preferred to satisfy one or more conditional expressions provided below.

$$0.20 < BF/f < 1.80 \quad (3)$$

$$0.65 < DSP/TD < 0.95 \quad (4)$$

$$0.3 < ID/WD < 6.0 \quad (5)$$

$$0.5 \leq |\beta| \quad (6)$$

Here, the back focus is a distance from a final lens surface to the image plane. The lens total length is a distance obtained by adding a value of the back focus BF to a distance from a first lens surface to the final lens surface. Further, the closest distance is a distance to an object away from the light guide member 11 by 20 mm when numerical value data of the image pickup optical system 51 described later is represented in unit of mm.

Next, the technical meaning of each of the above-mentioned conditional expressions is described. The conditional expression (3) relates to a ratio of the back focus when focusing on the object at infinity and the focal length of the entire system, and is intended to optimize the length of the back focus of the image pickup optical system 51. When the value exceeds the upper limit of the conditional expression (3) and the back focus is excessively lengthened, the lens total length is lengthened, and it is difficult to reduce the image pickup optical system 51 in size. When the value falls below the lower limit of the conditional expression (3) and the back focus is excessively shortened, an off-axial ray enters the image plane at a large incident angle. As a consequence, light fluxes that are supposed to reach the peripheral portion of a screen do not sufficiently reach a light receiving element (image pickup element), with the result that shading occurs at many portions, which is not preferred.

The conditional expression (4) relates to a ratio of a distance on the optical axis from the aperture stop SP and the image plane to the lens total length of the entire system, and is intended to optimize a position of the aperture stop SP in the image pickup optical system 51. Here, the lens total length is a distance from the first lens surface to the image plane when focusing on the object at infinity. The effective diameter of a front lens of the image pickup optical system 51 is increased along with increase in angle of view of the image pickup optical system 51. When the conditional expression (4) is satisfied, reduction of the effective diameter of the front lens and an increased angle of view are achieved while a so-called partial stop state is avoided, in which the center of a light flux at a peripheral angle of view does not pass near the center of the aperture stop SP.

When the value exceeds the upper limit of the conditional expression (4), an entrance pupil position becomes closer, and the focus lens unit is increased in size in a radial direction, which is not preferred. When the value falls below the lower limit of the conditional expression (4), an off-axial light flux enters the lens unit on the object side at a high incident height when focusing on a close distance object, leading to increase in effective diameter of the lens unit on the object side.

The conditional expression (5) defines a ratio of the inner diameter of the light guide member 11 and a distance on the optical axis from the light guide member 11 to an object surface when the image pickup optical system 51 focuses on the closest distance object. The conditional expression (5) is intended to reduce the illumination device in size. When the value exceeds the upper limit of the conditional expression (5) and the inner diameter of the light guide member 11 is increased, the illumination device 10 is increased in size. In contrast, when the value falls below the lower limit of the conditional expression (5) and the inner diameter of the light guide member 11 is reduced, it is difficult to mount the lens system on the inner side of the light guide member 11.

The conditional expression (6) defines an image magnification (imaging magnification) of the image pickup optical system 51 when focusing on the closest distance object. When the value falls below the lower limit value of the conditional expression (6), an effect as the image pickup optical system 51 for macro photography cannot be sufficiently exhibited, which is not preferred. It is preferred that the numerical value ranges of the conditional expressions (3) to (6) be set to the following ranges.

$$0.25 < BF/f < 1.70 \quad (3a)$$

$$0.70 < DSP/TD < 0.93 \quad (4a)$$

$$0.35 < ID/WD < 5.50 \quad (5a)$$

$$0.7 \le -\beta \quad (6a)$$

It is more preferred that the numerical value ranges of from the conditional expression (3a) to the conditional expression (6a) be set to the following ranges.

$$0.30 < BF/f < 1.60 \quad (3b)$$

$$0.75 < DSP/TD < 0.90 \quad (4b)$$

$$0.4 < ID/WD < 5.0 \quad (5b)$$

$$1.0 \le -\beta \quad (6b)$$

The exemplary embodiments of the present invention are described above, but the present invention is not limited to these embodiments and can be modified and changed variously within the scope of the gist thereof.

FIG. 4, FIG. 5, and FIG. 6A and FIG. 6B are plan views for illustrating the arrangements and the like of the image pickup optical system 51, the light guide member, and the light source of the lens apparatus according to Examples 1, 2, and 3 of the present invention, respectively. In Example 1 of FIG. 4, the outer diameter of the holding frame 51a is represented by DB, the outer diameter of the front lens on the object side of the image pickup optical system 51 is represented by DL, the outer diameter of the light guide member 11 is represented by OD, and the inner diameter of the light guide member 11 is represented by ID. In Example 1 of FIG. 4, the light guide member 11 includes two pieces-of-circle 21 and 22 obtained by cutting a part of a circle.

Figure 4:
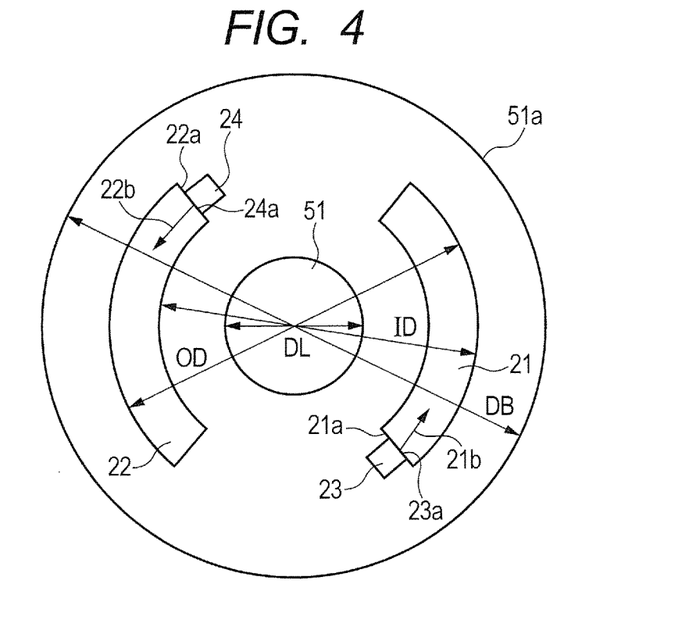
FIG. 4 is a main-part plan view of a lens apparatus of Example 1 of the present invention.

Further, a light source 23 is arranged on an end portion 21a of the piece-of-circle 21 such that the normal line of a light emitting surface 23a faces a tangential direction 21b of the piece-of-circle 21. Similarly, a light source 24 is provided on an end portion 22a of the piece-of-circle 22 such that the normal line of a light emitting surface 24a faces a tangential direction 22b of the piece-of-circle 22.

Figure 5:
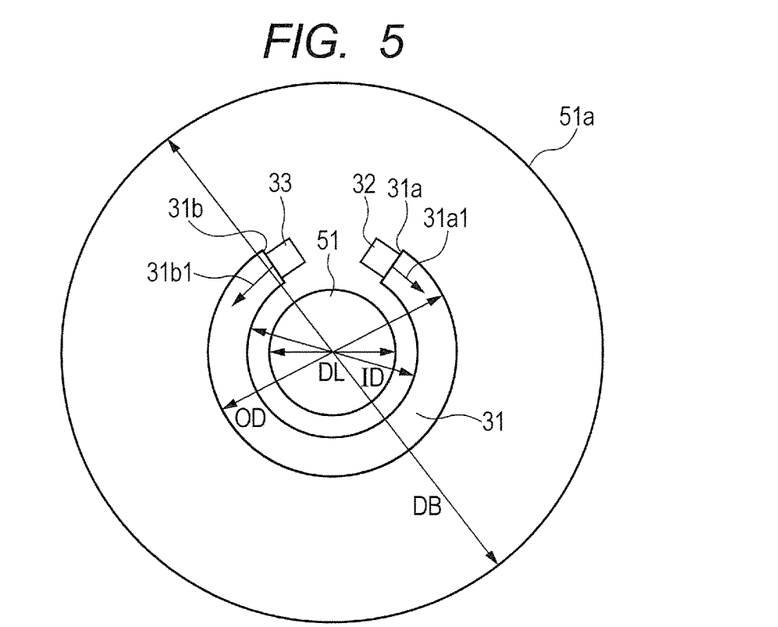
FIG. 5 is a main-part plan view of a lens apparatus of Example 2 of the present invention.

In Example 2 of FIG. 5, the outer diameter of the holding frame 51a is represented by DB, the outer diameter of the front lens on the object side of the image pickup optical system 51 is represented by DL, the outer diameter of the light guide member 11 is represented by OD, and the inner diameter of the light guide member 11 is represented by ID. In Example 2 of FIG. 5, the light guide member 11 includes one piece-of-circle 31 obtained by cutting a part of a circle. Light sources 32 (33) are arranged on both end portions 31a (31b) of the piece-of-circle 31 such that the normal directions of the light emitting surfaces thereof face tangential directions 31a1 (31b1) of the piece-of-circle 31.

Figure 6A:
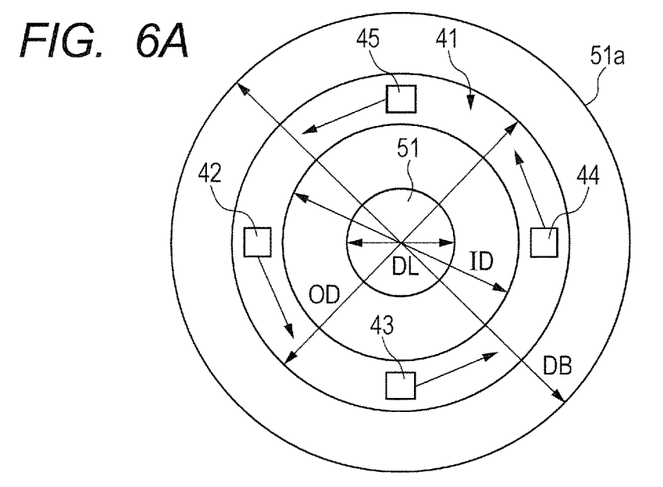
FIG. 6A is a main-part plan view of a lens apparatus of Example 3 of the present invention.
Figure 6B:
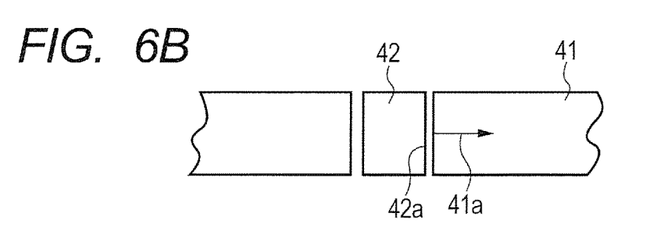
FIG. 6B is a partial sectional view of the lens apparatus of Example 3.

In Example 3 of FIG. 6A, the outer diameter of the holding frame 51a is represented by DB, the outer diameter of the front lens on the object side of the image pickup optical system 51 is represented by DL, the outer diameter of the light guide member 41 is represented by OD, and the inner diameter of the light guide member 41 is represented by ID. In Example 3, as illustrated in FIG. 6B that is a partial sectional view of FIG. 6A, a light source 42 is arranged in a recessed region formed by cutting out a part of the circle of the light guide member 41. In this case, the light source 42 is arranged inside the cutout portion of the light guide member 41 such that the normal direction of a light emitting surface 42a faces a tangential direction 41a of the circle of the light guide member 41. Other light sources 43, 44, and 45 are arranged similarly to the light source 42.

In Example 3 of FIG. 6A and FIG. 6B, the four light sources 42 to 45 are arranged on the periphery of the circular light guide member 41 with substantially equal intervals. The number of light sources may take any value as long as the light sources are provided with equal intervals.

Next, a digital still camera (image pickup apparatus) according to Example of the present invention, which uses the image pickup optical system of the present invention, is described with reference to FIG. 7.

Figure 7:
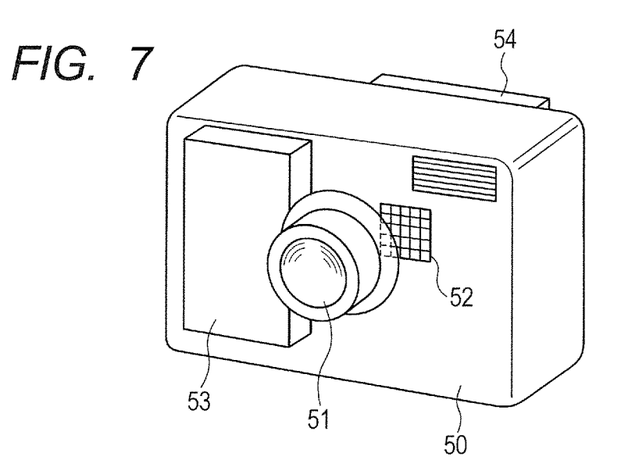
FIG. 7 is a main-part schematic view of an image pickup apparatus of the present invention.

In FIG. 7, a camera body 50 is provided with an image pickup optical system 51 on which the lens apparatus of the present invention can be mounted. An image pickup element (photo-electric conversion element) 52 is, for example, a CCD sensor or a CMOS sensor, which is built in the camera body and is configured to receive light of an object image formed by the image pickup optical system 51, and a memory 53 is configured to record information corresponding to an object image that is subjected to photoelectric conversion by the image pickup element 52. A finder 54 is made up of a liquid crystal display panel or the like, and is used for observing an object image formed on the image pickup element 52.

In the following, the numerical value data of the image pickup optical system on which the lens apparatus of the present invention can be mounted is described. In the numerical value data, the order of a surface counted from the object side is represented by i, and a curvature radius of an i-th surface is represented by ri. An interval between the i-th surface and an (i+1)th surface is represented by di. A refractive index and an Abbe number of a material between the i-th surface and the (i+1)th surface with a d-line being reference are represented by ndi and vdi, respectively. The asterisk (*) suffixed to a surface indicates that the surface has an aspherical shape. Aspherical surface data shows aspherical coefficients when an aspherical surface is represented by the following expression.

$$x = (h^2/R)/[1+\{1-(1+k)(h/R)^2\}^{1/2}] + B \cdot h^4 + C \cdot h^6 + D \cdot h^8 + E \cdot h^{10}$$

In the expression, x represents a shift amount from a reference surface in the optical axis direction, h represents a height in a direction perpendicular to the optical axis, R represents a radius of a quadric surface being a base, k represents a conic constant, and B, C, D, and E represent 4th, 6th, 8th, and 10th order aspherical coefficients. "e-Z" means "10$^{-Z}$". A relationship between each of the above-mentioned conditional expressions and the numerical value of a parameter of each Example is shown in Table 1.

(Numerical Data 1)

| Unit mm | | | | |
|---|---|---|---|---|
| Surface data | | | | |
| Surface number i | ri | di | ndi | vdi |
| 1 | −197.665 | 0.50 | 1.58313 | 59.5 |
| 2* | 8.009 | 3.33 | | |
| 3 (FC) | ∞ | −0.30 | | |
| 4 | 34.792 | 1.84 | 1.80518 | 25.4 |
| 5 | −34.792 | 2.55 | | |
| 6 | −39.399 | 1.22 | 1.77250 | 49.6 |
| 7 | −24.094 | 1.67 | | |
| 8 | −23.519 | 0.60 | 1.95375 | 32.3 |
| 9 | 82.440 | 0.95 | | |
| 10 (FP) | ∞ | 1.90 | | |

-continued

Unit mm

| | | | | |
|---|---|---|---|---|
| 11 (stop) (SP) | ∞ | 0.61 | | |
| 12 | 16.940 | 5.23 | 1.51823 | 58.9 |
| 13 | -16.940 | 2.75 | | |
| 14 | -12.932 | 0.65 | 1.90366 | 31.3 |
| 15 | -143.739 | 0.15 | | |
| 16 | 26.215 | 4.23 | 1.49700 | 81.5 |
| 17 | -18.292 | 0.15 | | |
| 18* | 64.432 | 2.97 | 1.58313 | 59.5 |
| 19* | -17.234 | 0.29 | | |
| 20 (FC) | ∞ | (Variable) | | |
| 21 | 51.516 | 1.22 | 1.95906 | 17.5 |
| 22 | 332.148 | 0.45 | 1.83481 | 42.7 |
| 23 | 16.990 | 42.22 | | |
| Image surface | ∞ | | | |

Aspherical surface data

Second surface

K = 0.00000e+000  B = -1.76791e-004  C = -2.65273e-006
D = 7.81442e-009  E = -6.68614e-010

Eighteenth surface

K = 0.00000e+000  B = -7.23379e-005  C = -1.23764e-008
D = -2.58452e-009  E = 1.02225e-010

Nineteenth surface

K = 0.00000e+000  B = 6.10927e-005  C = 1.30720e-007
D = -2.33941e-009  E = 1.12506e-010

Various data

| | |
|---|---|
| Focal length | 27.74 |
| F number | 3.61 |
| Half angle of view (degree) | 26.21 |
| Image height | 13.66 |

| | Infinity | (Imaging magnification) × 1.00 |
|---|---|---|
| d20 | 0.94 | 8.75 |

TABLE 1

| | Example 1 | Example 2 | Example 3 |
|---|---|---|---|
| Numerical | | | |
| DB | 46.0 | 54.3 | 54.1 |
| OD | 33.0 | 24.4 | 40.6 |
| ID | 24.0 | 16.8 | 28.0 |
| DL | 12.6 | 12.6 | 12.6 |
| WD | 20.0 | 20.0 | 20.0 |
| DSP | 61.9 | 61.9 | 61.9 |
| TD | 76.1 | 76.1 | 76.1 |
| BF | 42.2 | 42.2 | 42.2 |
| f | 27.7 | 27.7 | 27.7 |
| β | -1.00 | -1.00 | -1.00 |
| Conditional Expression | | | |
| (1) | 0.71 | 0.45 | 0.75 |
| (2) | 0.525 | 0.75 | 0.45 |
| (3) | 1.52 | 1.52 | 1.52 |
| (4) | 0.813 | 0.813 | 0.813 |
| (5) | 1.20 | 0.84 | 1.40 |
| (6) | 1.00 | 1.00 | 1.00 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-007071, filed Jan. 18, 2016, which is hereby incorporated by reference herein in its entirety.

What is claimed is:

1. A lens apparatus, comprising:
an image pickup optical system;
a holding frame configured to hold the image pickup optical system; and
an illumination device that is mounted on an object side of the holding frame, and is configured to radiate light, wherein the illumination device comprises:
a light guide member that has a circular optical path in which light is subjected to internal reflection to propagate, and a light emitting surface for emitting the light to the object side; and
a light source that is arranged such that a normal direction of a light emitting surface of the light source faces a tangential direction of a circle of the light guide member, and is configured to emit light entering the light guide member, and
wherein the following conditional expressions are satisfied:

$$0.2 < OD/DB < 1.0; \text{ and}$$

$$0.2 < DL/ID < 1.0,$$

where DB represents an outer diameter of the holding frame, OD represents an outer diameter of the light guide member, ID represents an inner diameter of the light guide member, and DL represents an outer diameter of a lens closest to the object side of the image pickup optical system.

2. A lens apparatus according to claim 1, wherein the following conditional expression is satisfied:

$$0.20 < BF/f < 1.80,$$

where BF represents a back focus of the image pickup optical system when focusing on an object at infinity, and f represents a focal length of the image pickup optical system.

3. A lens apparatus according to claim 1, further comprising, on the object side of the light emitting surface of the light guide member, a diffuser plate configured to diffuse the light emitted from the light emitting surface of the light guide member.

4. A lens apparatus according to claim 1,
wherein the image pickup optical system comprises an aperture stop, and
wherein the following conditional expression is satisfied:

$$0.65 < DSP/TD < 0.95,$$

where TD represents a lens total length of the image pickup optical system, and DSP represents a distance from the aperture stop to an image plane.

5. A lens apparatus according to claim 1, wherein the following conditional expression is satisfied:

$$0.3 < ID/WD < 6.0,$$

where WD represents a distance from the light guide member to a closest distance object when the image pickup optical system focuses on the closest distance object.

6. A lens apparatus according to claim 1, wherein the following conditional expression is satisfied:

$$0.5 \le |\beta|,$$

where β represents an imaging magnification of the image pickup optical system when focusing on a closest distance object.

7. A lens apparatus according to claim 1, wherein the illumination device is removable from the holding frame.

8. A lens apparatus according to claim 1, wherein the light guide member comprises a reflecting portion provided on one side surface opposite to the object side of the light guide member, for reflecting light entering the light guide member from a light entrance surface of the light guide member.

9. An image pickup apparatus, comprising:
a lens apparatus; and
an image pickup element configured to receive an image formed by the lens apparatus,
the lens apparatus comprising:
an image pickup optical system;
a holding frame configured to hold the image pickup optical system; and
an illumination device that is mounted on an object side of the holding frame, and is configured to radiate light,
wherein the illumination device comprises:
a light guide member having a circular optical path in which light is subjected to internal reflection to propagate, and a light emitting surface for emitting the light to the object side; and
a light source that is arranged such that a normal direction of a light emitting surface of the light source faces a tangential direction of a circle of the light guide member, and is configured to emit light entering the light guide member, and
wherein the following conditional expressions are satisfied:

$$0.2 < OD/DB < 1.0; \text{ and}$$

$$0.2 < DL/ID < 1.0,$$

where DB represents an outer diameter of the holding frame, OD represents an outer diameter of the light guide member, ID represents an inner diameter of the light guide member, and DL represents an outer diameter of a lens closest to the object side of the image pickup optical system.

* * * * *